United States Patent
Jarosz et al.

(10) Patent No.: US 6,293,606 B1
(45) Date of Patent: Sep. 25, 2001

(54) ADJUSTABLE MOTORCYCLE WINDSHIELD

(75) Inventors: Michael J. Jarosz, Pewaukee; Anthony E. Kopp, West Allis, both of WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 09/620,061

(22) Filed: Jul. 19, 2000

(51) Int. Cl.$^7$ ............................................. B60J 1/04
(52) U.S. Cl. .................................. 296/78.1; 296/92
(58) Field of Search .................. 296/78.1, 92; 280/288.4

(56) References Cited

U.S. PATENT DOCUMENTS

| | | | |
|---|---|---|---|
| 1,050,944 | * 1/1913 | Inshaw | 296/92 |
| 3,904,238 | 9/1975 | Anderson et al. | 296/78.1 |
| 4,082,345 | 4/1978 | Willey | 296/78.1 |
| 4,089,556 | 5/1978 | Stobar | 296/78.1 |
| 4,166,650 | 9/1979 | Saunders, IV | 296/78.1 |
| 4,168,098 | 9/1979 | Willey | 296/78.1 |
| 4,269,445 | 5/1981 | Gager, Jr. | 296/78.1 |
| 4,353,590 | 10/1982 | Wei-Chuan | 296/78.1 |
| 4,355,838 | 10/1982 | Hickman | 296/78.1 |
| 4,379,584 | 4/1983 | Willey | 296/78.1 |
| 4,461,508 | 7/1984 | Ogishima | 296/78.1 |
| 4,465,315 | 8/1984 | Barstow | 296/78.1 |
| 4,489,973 | 12/1984 | Willey | 296/78.1 |
| 4,606,571 | 8/1986 | Fujita | 296/89 |
| 4,615,556 | 10/1986 | Stahel | 296/78.1 |
| 4,632,448 | 12/1986 | Yagasaki et al. | 296/218 |
| 4,696,509 | 9/1987 | Yagasaki et al. | 296/96.21 |
| 4,707,017 | 11/1987 | Minobe et al. | 296/78.1 |
| 4,790,555 | 12/1988 | Nobile | 296/78.1 |
| 4,830,423 | 5/1989 | Nebu et al. | 296/78.1 |
| 5,490,573 | 2/1996 | Hagiwara et al. | 180/68.1 |
| 5,730,483 | 3/1998 | Greger | 296/78.1 |
| 5,855,404 | 1/1999 | Saunders | 296/78.1 |
| 5,857,727 | 1/1999 | Vetter | 296/78.1 |

FOREIGN PATENT DOCUMENTS

| | | |
|---|---|---|
| 2629731A1 | 1/1978 | (DE) . |
| 3941875A1 | 6/1991 | (DE) . |
| 3941875C2 | 6/1991 | (DE) . |
| 4232239A1 | 3/1994 | (DE) . |
| 0060807A1 | 9/1982 | (EP) . |
| 0685385B1 | 12/1995 | (EP) . |
| 2218060A | 11/1989 | (GB) . |

* cited by examiner

*Primary Examiner*—Joseph D. Pape
*Assistant Examiner*—Patricia L. Engle
(74) *Attorney, Agent, or Firm*—Michael Best Friedrich LLP

(57) ABSTRACT

An adjustable motorcycle windshield includes an actuating assembly including first and second actuating members that are preferably bell cranks mounted for rotation. Each actuating member actuates an upper and a lower extension arm to selectively move the windshield. The upper arms move the windshield farther than the lower arms, resulting in the inclination of the windshield being changed. The actuating assembly also includes connecting members connecting the upper arms to the windshield. A slot is provided in a frame member, and the connecting point between the upper arms and the connecting members translates in the slot as the windshield is being adjusted. Resilient lower windshield mounts are provided that permit limited rotation of the windshield during adjustment.

21 Claims, 6 Drawing Sheets

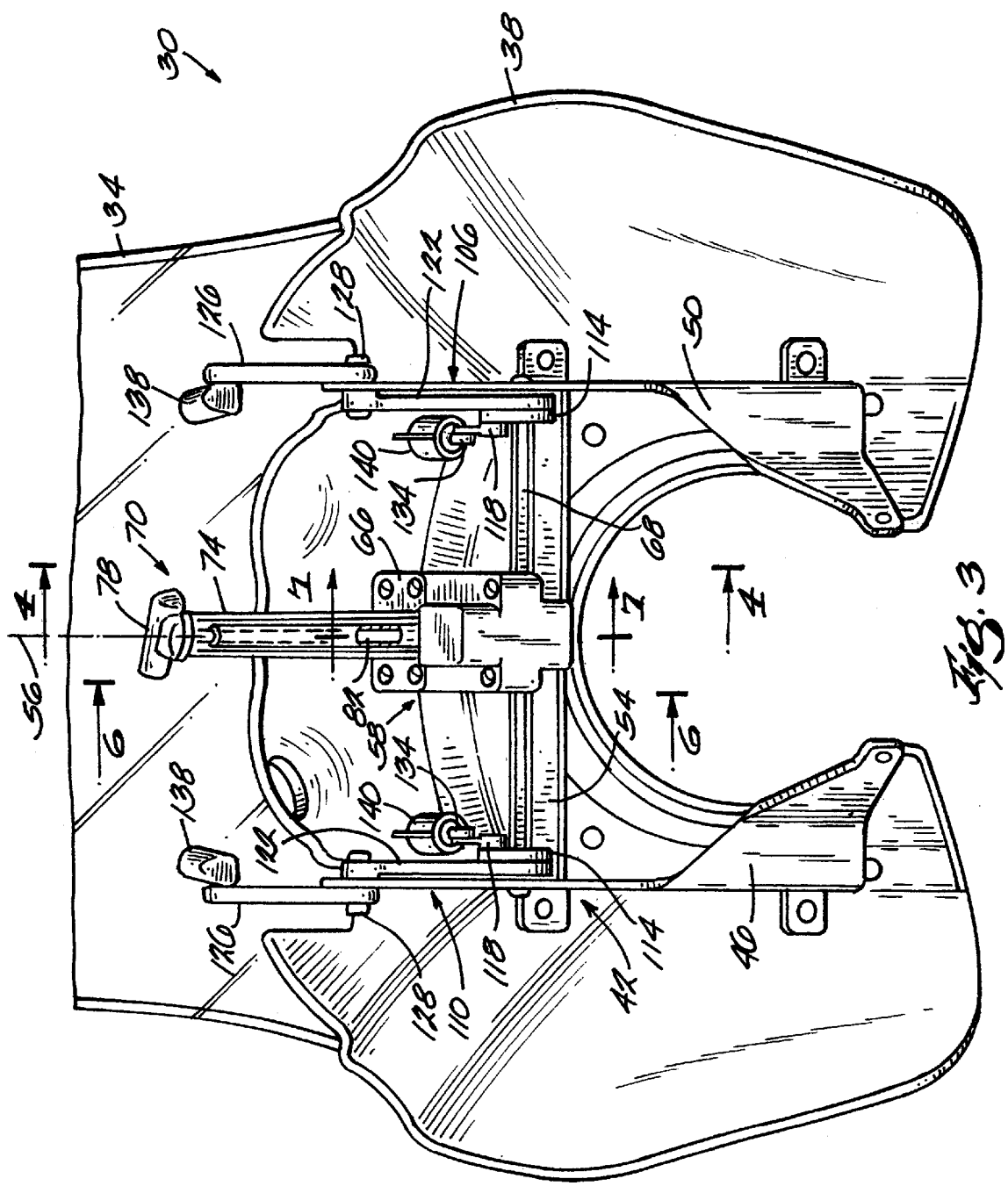

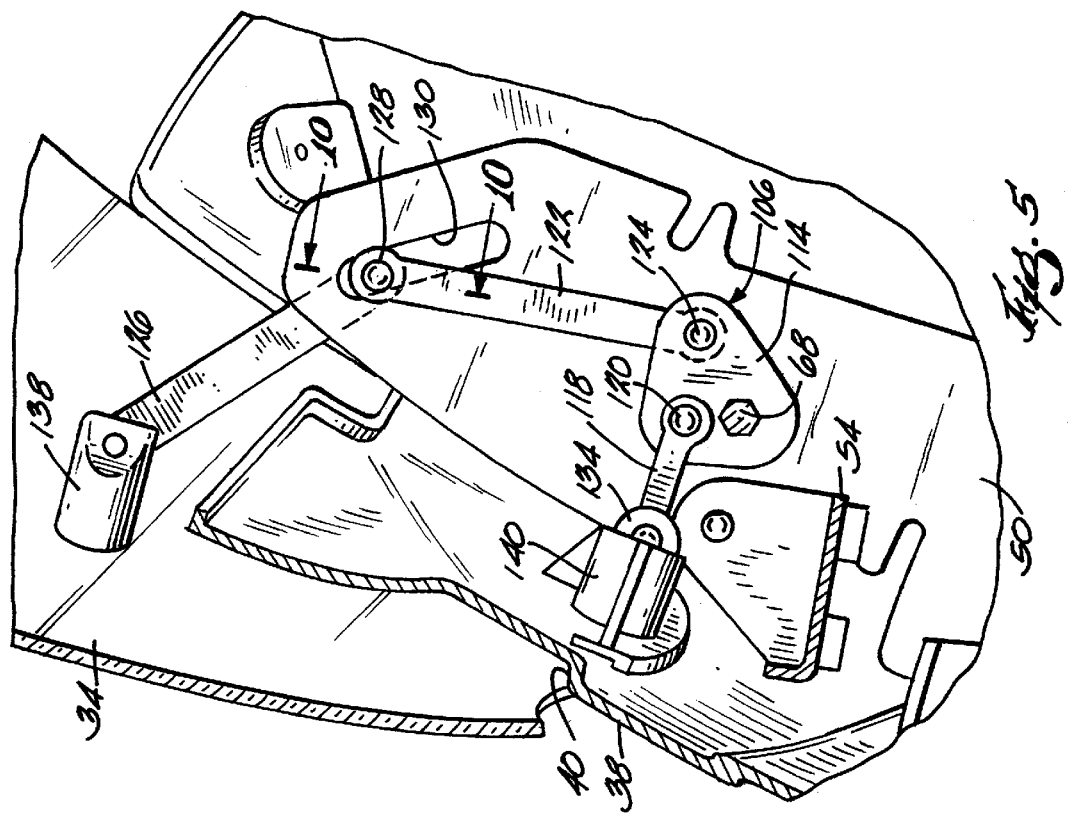
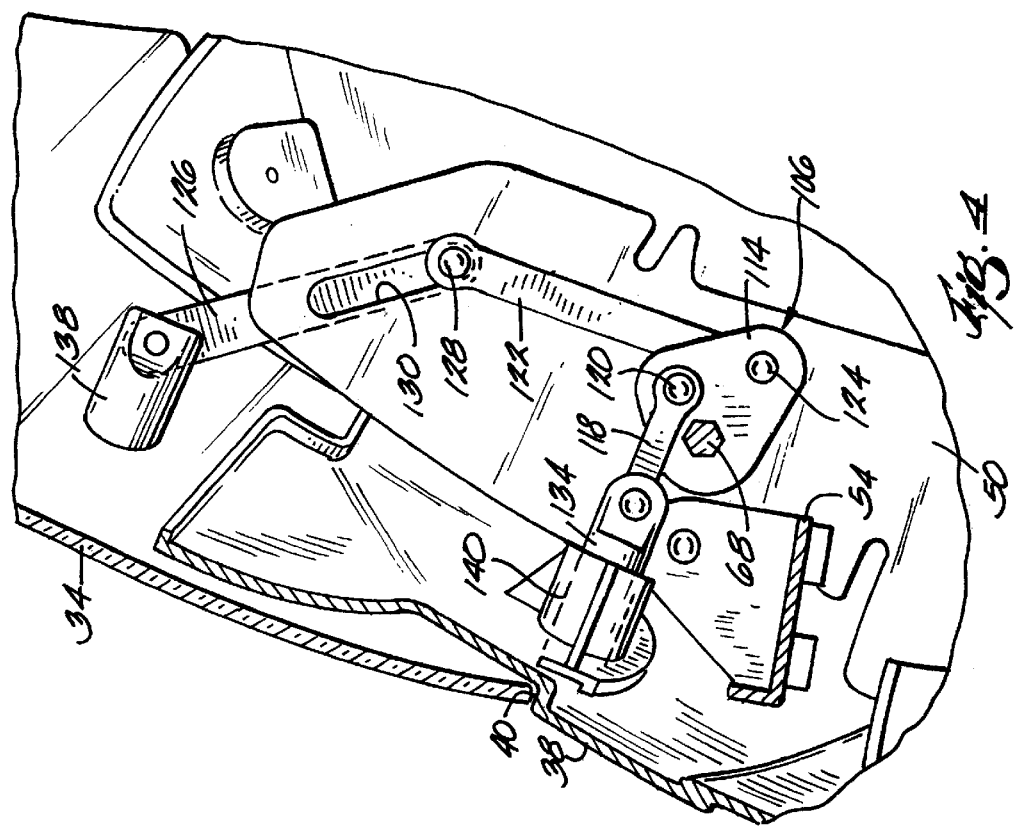

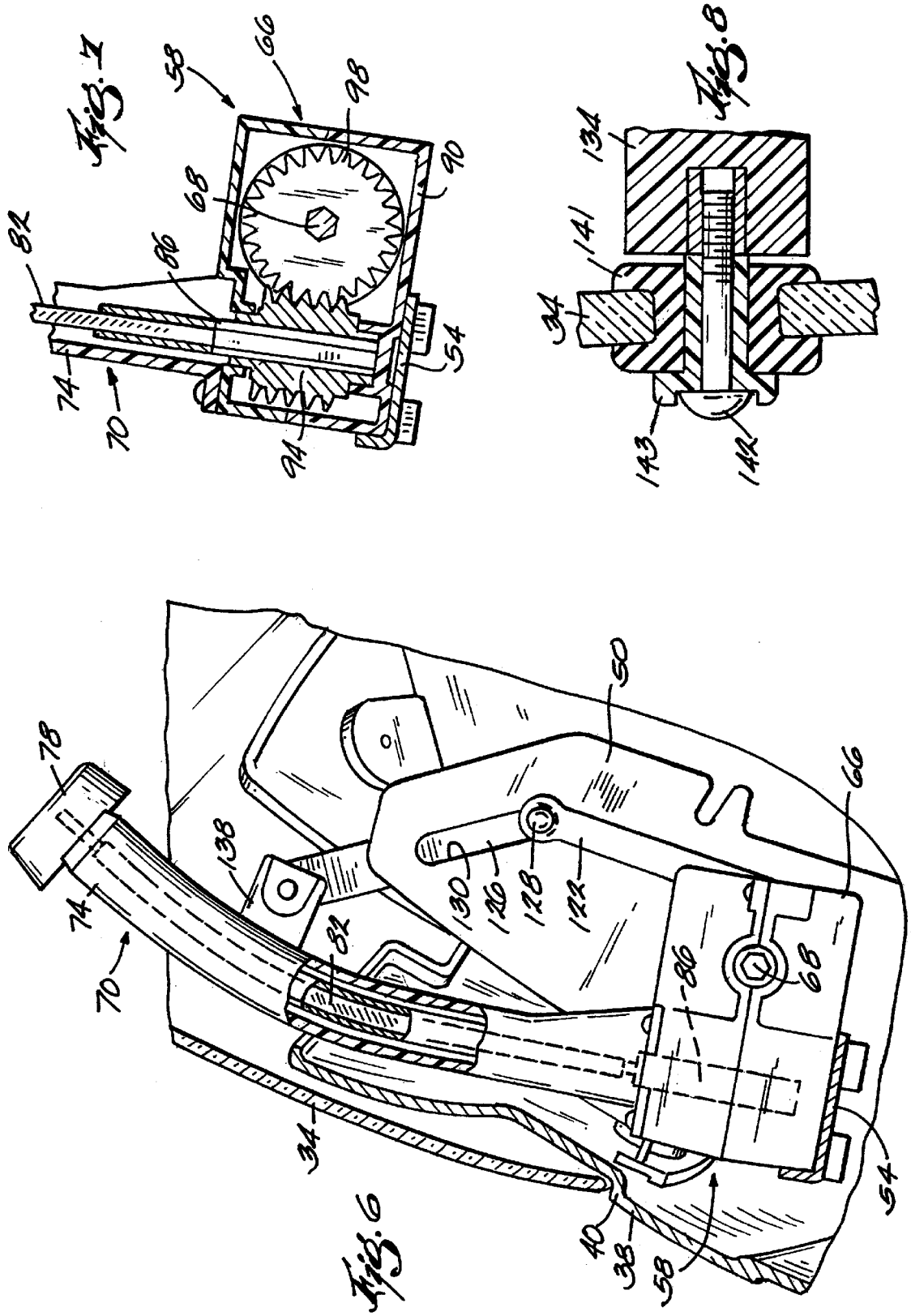

ADJUSTABLE MOTORCYCLE WINDSHIELD

FIELD OF THE INVENTION

The present invention relates to adjustable motorcycle windshields.

BACKGROUND OF THE INVENTION

It is known in the art to provide an adjustable windshield for motorcycles. U.S. Pat. No. 5,730,483 to Greger discloses one such device. The Greger patent discloses a windshield adjustment system that includes four guide arms, each pivotally connected to the windshield at one end and pivotally connected to the cycle body at the other end. The longitudinal centerline of the windshield separates the four guide arms into two pairs, each pair having a lower arms, and an upper arm. The lower guide arms are directly rotated by an actuator about a first fixed horizontal axis, causing the upper guide arms to rotate about a second fixed horizontal axis, and thereby adjusting the windshield inclination.

SUMMARY OF THE INVENTION

The present invention provides an adjustable motorcycle windshield assembly including a frame, a windshield, and a windshield actuating assembly interconnected between the windshield and the frame for adjusting the windshield inclination. Preferably, the actuating assembly includes an actuating member that is supported by the fame for movement (e.g., rotation). The actuating assembly also preferably includes first and second extension links interconnected between the actuating member and the windshield. Preferably, rotation of the actuating member causes the first and second extension links to move in combination to selectively elevate and increase the inclination of the windshield, or lower and decrease the inclination of the windshield. The actuating assembly is preferably operable in all intermediate positions between and including a lower position and an upper position.

A connecting member may be pivotally connected between the actuating member and the second extension link. The connecting member and second extension link are pivotally interconnected at a pivot point, and the pivot point is movable within a slot in the frame. The slot may be substantially linear. The adjustable motorcycle windshield assembly also preferably includes a fairing supported by the frame. The first extension link preferably linearly reciprocates through a bore in the fairing. Due to the arrangement of parts, when the actuating member is rotated, the first extension link moves the windshield a first distance with respect to the frame, while the second extension link and the connecting member move the windshield a second distance with respect to the frame. The second distance is preferably greater than the first distance, causing the windshield to move away from the frame while rotating about the point of interconnection with the first extension link.

Preferably, the actuating assembly includes a second actuating member, a third extension link, and a fourth extension link. The third and fourth extension links are preferably both pivotally interconnected between the second actuating member and the windshield in a manner substantially identical to the first and second extension links, respectively. The third and fourth extension links are positioned as substantial mirror images of the first and second extension links, respectively. In this construction, rotation of the first and second actuating members causes the first, second, third, and fourth extension links to move in concert to selectively adjust the inclination of the windshield.

Preferably, the actuating assembly is constructed to resist undesired movement of the windshield with respect to the frame. In this regard, the actuating assembly may include a pair of meshing helical gears. More information and a better understanding of the present invention can be achieved by reference to the following drawings and detailed description.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

FIG. 3 is a rear view of the adjustable motorcycle windshield and fairing assembly shown in FIG. 1.

FIG. 4 is a cross-section view taken along line 4—4 in FIG. 3 showing the windshield in a lowered position.

FIG. 5 is a cross-section view taken along line 4—4 in FIG. 3 showing the windshield in a raised position.

FIG. 6 is a cross-section view taken along line 6—6 in FIG. 3.

FIG. 7 is a cross-section view taken along line 7—7 in FIG. 3.

FIG. 8 is a cross-section view taken along line 8—8 in FIG. 2.

DETAILED DESCRIPTION OF PREFERRED EMBODIMENTS

Figure 1:
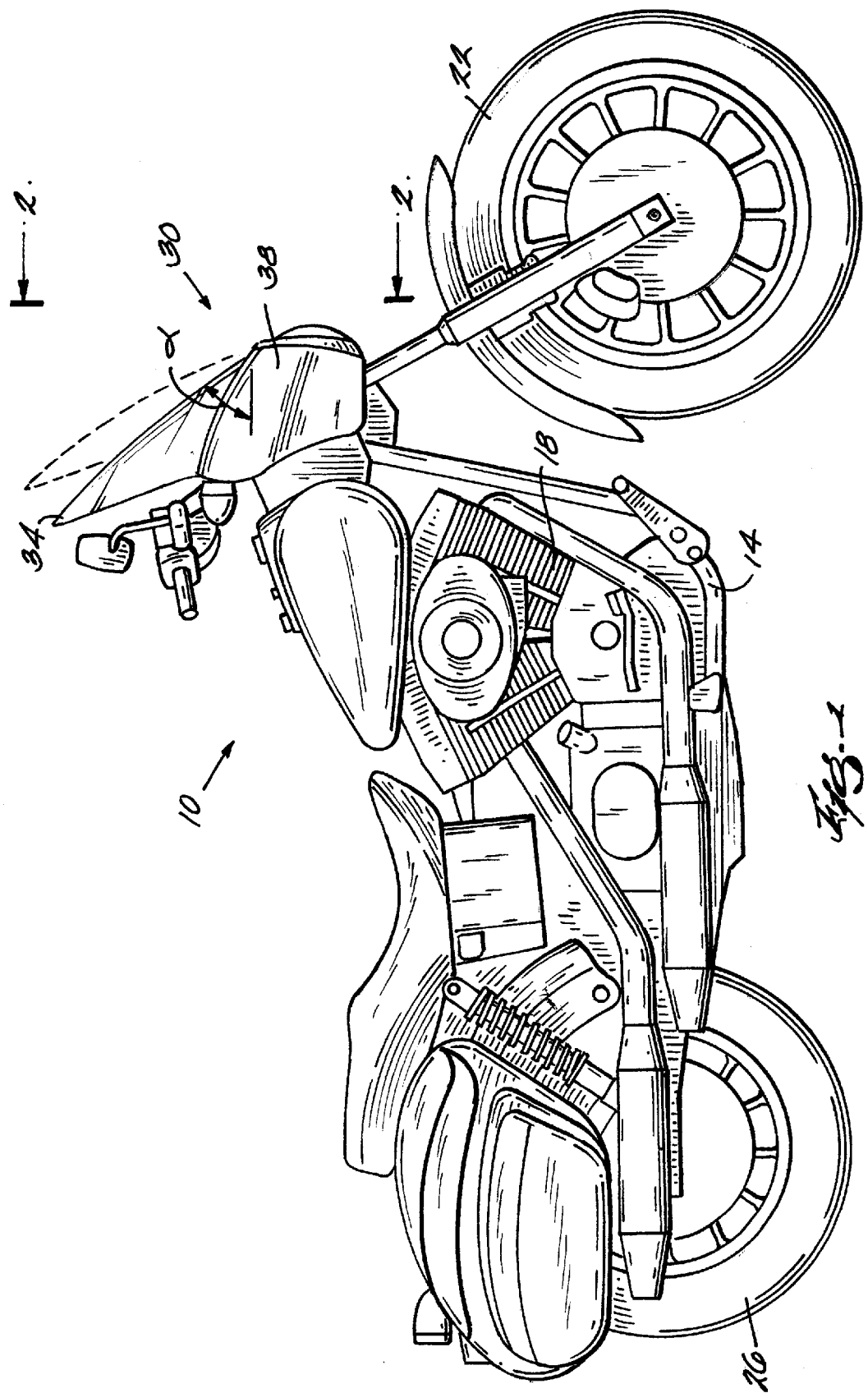
FIG. 1 is a side view of a motorcycle embodying the present invention.
Figure 2:
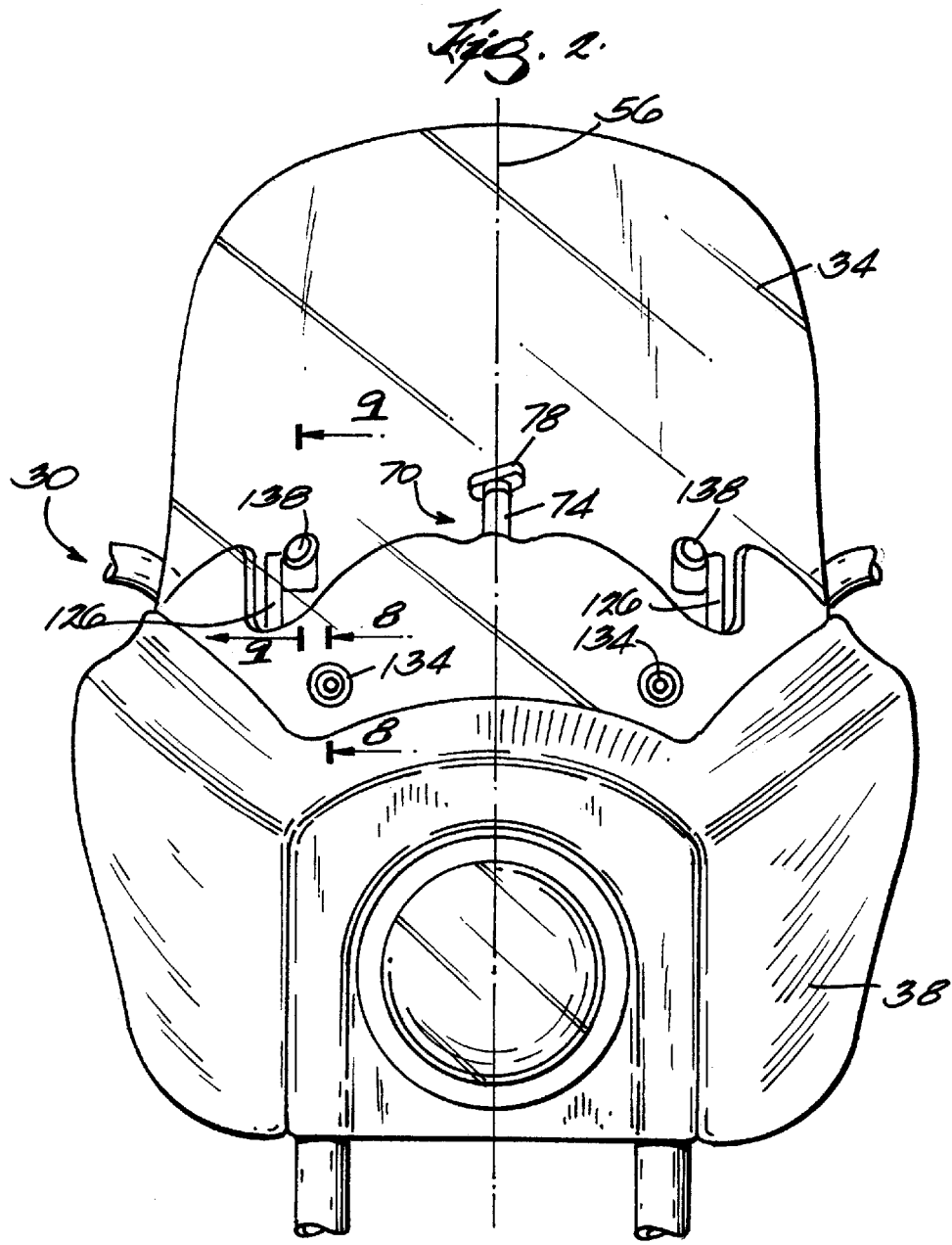
FIG. 2 is a view taken along line 2—2 in FIG. 1.

FIG. 1 illustrates a motorcycle 10 embodying the present invention. The left side and right side of the motorcycle 10 are defined herein from the perspective of a rider sitting in the ordinary operating position. The motorcycle 10 has a motorcycle frame 14, an engine 18 interconnected to the motorcycle frame 14, a front wheel 22 rotatably mounted to the motorcycle frame 14, and a rear wheel 26 driven by the engine 18 and rotatably mounted to the motorcycle frame 14. The motorcycle 10 also includes a windshield and fairing assembly 30 (see also FIG. 2) interconnected with the motorcycle frame 14 and comprising an adjustable windshield 34 and a fairing 38. The windshield 34 is movable between a lowered position (shown in solid lines in FIG. 1) and a raised position (shown in phantom lines in FIG. 1).

As seen in FIGS. 4 and 5, the fairing 38 has formed therein a ledge 40. When in the lowered position, the bottom edge of the windshield 34 is positioned adjacent the ledge 40, and when in the raised position, the bottom edge is moved away from the ledge 40. Preferably, the windshield 34 is made from a clear acrylic polymer through a thermoforming or injection molding process.

As shown in FIG. 3, the windshield and fairing assembly 30 also includes a support frame 42 mounted to the fairing 38. Preferably, the support frame 42 has a left fairing support bracket 46, a right fairing support bracket 50, and a gearbox mount bracket 54 interconnected between the left fairing support bracket 46 and the right fairing support bracket 50. The windshield and fairing assembly 30 is characterized by a vertical longitudinal axis 56 substantially bisecting the windshield and fairing assembly 30. Preferably, each bracket 46, 50, 54 is made from a metal stamping and is assembled with suitable fasteners.

As shown in FIGS. 3, 6, and 7, the windshield and fairing assembly 30 has mounted thereto an actuating assembly 58 in the form of a gearbox 66 interconnected to the gearbox mount bracket 54, a manual actuator 70 interconnected to the gearbox 66, and a hexagonal shaft 68 extending through the gearbox 66. The manual actuator 70 includes a support collar 74 interconnected to the gearbox 66, an adjustment knob 78 supported for rotation by the support collar 74, and a torque cable 82 located within the support collar 74 and interconnected to the adjustment knob 78. The support collar 74 orients the adjustment knob 78 into a position easily accessible by the operator of the motorcycle 10 and provides a rigid base that facilitates manual actuation (e.g., rotation) of the adjustment knob 78. The manual actuator 70 also includes a hexagonal head 86 extending from the end of the torque cable 82. The hexagonal head 86 extends past the support collar 74 to provide a connector extending into the gearbox 66. The torque cable 82 translates the torque applied to the adjustment knob 78 to the hexagonal head 86.

The gearbox 66 is available from Seitz Corp., located in Torrington, Conn. As shown in FIG. 7, the gearbox 66 includes a housing 90 made of glass fiber reinforced nylon and having a nominal thickness of 0.100". The gearbox 66 includes a first helical or worm gear 94 mounted for rotation about a substantially vertical axis within the housing 90, and a second helical or worm gear 98 mounted for rotation about a substantially horizontal axis within the housing 90 and meshing with the first gear 94. The first gear 94 has a hexagonal bore that receives the hexagonal head 86 of the manual actuator 70. The second gear 98 also has a hexagonal bore through its center and through which the hexagonal shaft 68 extends. The first and second gears 94, 98 are preferably made from a glass fiber reinforced nylon. The first gear 94 and the second gear 98 permit the transfer of torque from the first gear 94 to the second gear 98, but resist the transfer of torque from the second gear 98 to the first gear 94. The gears 94 and 98 therefore allow adjustment of the windshield 34 by the operator, but resist movement of the windshield 34 due to the wind forces acting on the windshield 34 during operation of the motorcycle 10.

As best illustrated in FIGS. 3–5, the actuating assembly 58 also includes right and left assemblies that transfer rotation of the hexagonal shaft 68 into movement of the windshield 34. In the illustrated embodiment, the right and left assemblies are bell crank assemblies 106, 110 including bell cranks 114, however, any suitable actuating member may be substituted for the bell cranks 114, including but not limited to movable actuating members that operate by linear reciprocation and/or rotation. The right and left bell crank assemblies 106, 110 are substantially mirror images of each other about the longitudinal axis 56 of the windshield and fairing assembly 30. Therefore, only the right bell crank assembly 106 is described in detail below, but the same reference numerals are provided in the drawings for the components of the left bell crank assembly 110.

The right bell crank 114 is rotatably mounted to the right fairing support bracket 50. The hexagonal shaft 68 extends through the bell crank 114 and the bracket 50. The bell crank 114 is therefore mounted for rotation with the hexagonal shaft 68. A snap ring or clip can be used to substantially prevent the bell crank 114 from sliding on the hexagonal shaft 68.

The right bell crank assembly 106 also includes a lower extension link 118 having a first end and a second end. The first end of the lower extension link 118 is rotatably mounted (e.g., with a rivet 120) to the bell crank 114 and the second end of the lower extension link 118 is interconnected with the windshield 34. The lower extension link 118 is connected to the bell crank 114 at a point that will provide translation of the lower extension link 118 over a distance sufficient to move the windshield 34 away from the fairing 38 in response to rotation of the bell crank 114.

The right bell crank assembly 106 also includes a connecting member or bell crank link 122 having a first end and a second end. The first end of the bell crank link 122 is rotatably mounted (e.g., with a rivet 124) to the bell crank 114. The right bell crank assembly 106 also includes an upper extension link 126 having a first end and a second end. The first end of the upper extension link 126 and the second end of the bell crank link 122 are positioned on opposite sides of the bracket 50.

Figure 10:
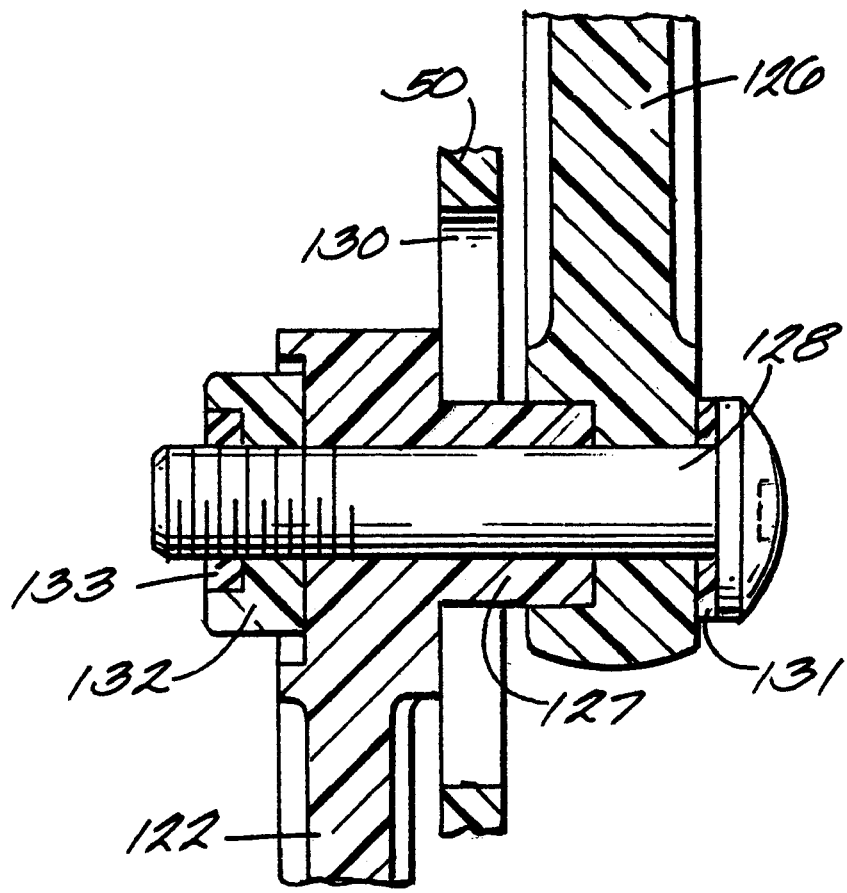
FIG. 10 is a cross-section view taken along line 10—10 in FIG. 5.

As seen in FIGS. 4, 5, and 10, a portion 127 of the bell crank link 122 extends through a slot 130 in the bracket 50 and extends into the end of the upper extension link 126. A bolt or pin 128 couples the ends of the bell crank link 122 and upper extension link 126 for relative pivotal motion. The illustrated slot 130 is substantially linear, but may alternatively be arcuate or any shape that facilitates the below-described operation of the actuating assembly 58. A washer 131 and a nut 132 are also provided as illustrated in FIG. 10. The nut 132 preferably includes an insert 133 that resists relative rotation between the bolt 128 and nut 132. The coupled ends of the bell crank link 122 and upper extension link 126 pivot with respect to each other and together translate along the slot 130. The second end of the upper extension link 126 is interconnected with the windshield 34 as described below.

Although in the preferred embodiment the upper extension link 126 is interconnected to the bell crank link 122 rather than directly to the bell crank 114, the upper extension link 126 can be said to be operably interconnected to the bell crank 114. It should be noted that throughout the specification and claims herein, when one element is said to be "interconnected" with or to another, this should not be limited to mean that one element is fastened, secured, or otherwise attached directly to another element. Instead, the term "interconnected" means that one element is either connected directly or indirectly to another element or is mechanically coupled with another element.

As shown in FIGS. 2–5, 8, and 9 the windshield and fairing assembly 30 also includes lower windshield mounts 134 interconnected between the lower extension links 118 and the windshield 34, and upper windshield mounts 138 interconnected between the upper extension links 126 and the windshield 34.

The lower windshield mounts 134 provide non-rigid, resilient mounting points that allow for slight rotation of the windshield 34 about the lower mounting points during window adjustment. The lower windshield mounts 134 each include a cylindrical portion received within a bore 140 (FIGS. 3–5) formed in the fairing 38. The lower windshield mounts 134 linearly reciprocate within the bores 140 to move the windshield 34.

With reference to FIG. 8, the lower windshield mounts 134 have a resilient grommet 141 located within a hole in the windshield 34. Preferably, a screw 142 is positioned within a plastic sleeve 143 and then inserted through the grommet 141 and threaded into the lower windshield mount 134. The resilient nature of the grommet 141 permits limited rotation of the windshield 34 with respect to the screw 142 and sleeve 143.

Figure 9:
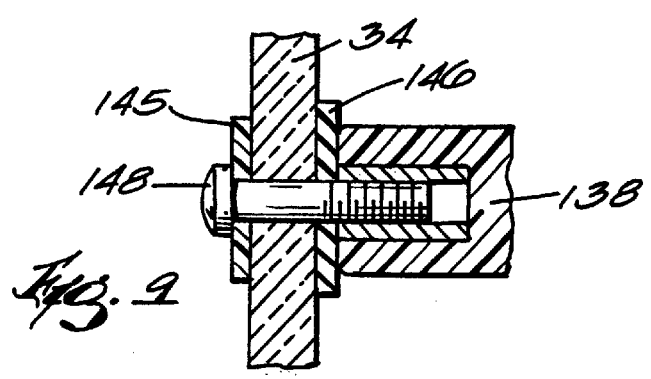
FIG. 9 is a cross-section view taken along line 9—9 in FIG. 2.

With reference to FIG. 9, the illustrated upper windshield mounts 138 are substantially rigidly interconnected with the windshield 34, and permit substantially no relative rotation between the windshield 34 and upper windshield mounts 138. The upper windshield mounts 138 have an exterior washer 145 and an interior washer 146 that sandwich the windshield 34. Preferably, a screw 148 is inserted through the exterior washer 145, the windshield 34, and the interior washer 146 and threaded into the upper windshield mount 138.

The operation of the windshield and fairing assembly 30 is best illustrated in FIGS. 1, 3, 4, 5, and 6. When an operator of the motorcycle 10 wishes to adjust the angle of inclination a of the windshield 34 to redirect the flow of air, the operator turns the adjustment knob 78. The adjustment knob 78 transfers a torque through the torque cable 82 to the hexagonal head 86 positioned within the hexagonal bore of the first gear 94 of the gearbox 66. The torque of the hexagonal head 86 rotates the first gear 94, which in turn rotates the second gear 98. The rotation of the second gear 98 causes the hexagonal shaft 68 to rotate, which actuates the right and left bell crank assemblies 106, 110.

The rotation of the bell cranks 114 actuates the lower extension links 118 and the bell crank links 122. The lower extension links 118 actuate the lower windshield mounts 134 in the bores 140 in the fairing 38, causing the windshield 34 to move with respect to the fairing 38. The bell crank links 122 actuate the first ends of the upper extension links 126 in a linear direction corresponding to the linear slot 130 within the fairing support brackets 46, 50. The second ends of the upper extension links 126 actuate the upper windshield mounts 138, moving the windshield 34 with respect to the fairing 38. Because the distance the upper windshield mounts 138 move is greater than the distance that the lower windshield mounts 134 move, the windshield 34 not only moves with respect to the fairing 38, it also rotates slightly about the lower windshield mounts 134 causing a change in the angle of inclination a (FIG. 1).

The embodiments described above and illustrated in the drawings are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An adjustable motorcycle windshield assembly comprising:
   a frame;
   a windshield interconnected with said frame; and
   an actuating assembly for adjusting said windshield, said actuating assembly including
      an actuating member including a bell crank supported by said frame for movement,
      a first extension link interconnecting said actuating member with said windshield, and
      a second extension link interconnecting said actuating member with said windshield, whereby the position of said windshield is adjustable by movement of said actuating member.

2. The motorcycle windshield of claim 1, wherein said actuating assembly further includes a manual actuator, wherein said actuating member is actuated in response to actuation of said actuator.

3. An adjustable motorcycle windshield comprising:
   a frame;
   a windshield interconnected with said frame; and
   an actuating assembly for adjusting said windshield, said actuating assembly including
      an actuating member supported by said frame for movement,
      a first extension link interconnecting said actuating member with said windshield, and
      a second extension link pivotable about a moveable axis of rotation and interconnecting said actuating member with said windshield, whereby the position of said windshield is adjustable by movement of said actuating member.

4. An adjustable motorcycle windshield comprising:
   a frame;
   a windshield interconnected with said frame; and
   an actuating assembly for adjusting said windshield, said actuating assembly including
      an actuating member supported by said frame for movement,
      a first extension link interconnecting said actuating member with said windshield,
      a second extension link interconnecting said actuating member with said windshield, whereby the position of said windshield is adjustable by movement of said actuating member, and
      a connecting member pivotally interconnecting said actuating member with said second extension link, wherein a portion of said second extension link is movable in a slot in said frame.

5. The motorcycle windshield of claim 4, wherein said slot is substantially linear.

6. An adjustable motorcycle windshield comprising:
   a frame;
   a windshield interconnected with said frame; and
   an actuating assembly for adjusting said windshield, said actuating assembly including
      an actuating member supported by said frame for movement,
      a first extension link interconnecting said actuating member with said windshield,
      a second extension link interconnecting said actuating member with said windshield, whereby the position of said windshield is adjustable by movement of said actuating member,
      a third extension link interconnecting said actuating member with said windshield, and
      a fourth extension link interconnecting said actuating member with said windshield, wherein the first extension link and the second extension link are positioned to a lateral side of a longitudinal center of the windshield and the third extension link and the fourth extension link are positioned to the opposed lateral side of the longitudinal center of the windshield.

7. An adjustable motorcycle windshield comprising:
   a frame;
   a windshield interconnected with said frame;
   an actuating assembly for adjusting said windshield, said actuating assembly including
      an actuating member supported by said frame for movement, a first extension link interconnecting said actuating member with said windshield, and a second extension link interconnecting said actuating member with said windshield, whereby the position of said windshield is adjustable by movement of said actuating member; and a fairing mounted to said frame, said fairing including a bore, wherein said first extension link includes a portion movable in said bore.

8. The windshield of claim 7, wherein said portion of said first extension link is generally cylindrical in shape and is supported for linear reciprocation in said bore.

9. A motorcycle comprising:

a motorcycle frame; and an adjustable motorcycle windshield assembly having a windshield interconnected with said motorcycle frame and an actuating assembly for adjusting said windshield, said actuating assembly including:
 a support frame,
 an actuating member supported by said support frame for movement,
 a first extension link interconnecting said actuating member with said windshield, and
 a second extension link pivotable about a moveable axis of rotation and interconnecting said actuating member with said windshield, whereby the position of said windshield is adjustable by movement of said actuating member.

10. The motorcycle of claim 9, wherein said actuating member includes a bell crank pivotably supported by said support frame.

11. The motorcycle of claim 9, wherein said actuating assembly further includes a connecting member pivotally interconnecting said actuating member with said second extension link, and wherein a portion of said second extension link is movable in a slot in said support frame.

12. The motorcycle of claim 11, wherein said slot is substantially linear.

13. The motorcycle of claim 9, wherein said actuating assembly further comprises a third extension link interconnecting said actuating member with said windshield, and a fourth extension link interconnecting said actuating member with said windshield, wherein the first extension link and the second extension link are positioned to a lateral side of a longitudinal center of the windshield and the third extension link and the fourth extension link are positioned to the opposed lateral side of the longitudinal center of the windshield.

14. The motorcycle of claim 9, further comprising a fairing mounted to said support frame, said fairing including a bore, wherein said first extension link includes a portion movable in said bore.

15. The motorcycle of claim 14, wherein said portion of said first extension link is generally cylindrical in shape and is supported for linear reciprocation in said bore.

16. The motorcycle of claim 9, wherein said actuating assembly further includes a manual actuator, wherein said actuating member is actuated in response to actuation of said manual actuator.

17. An adjustable motorcycle windshield assembly comprising:

a frame;

a windshield interconnected with said frame;

an actuating assembly for adjusting said windshield, said actuating assembly including
 first and second actuating members rotatably interconnected with said frame,
 a first lower extension link interconnecting said first actuating member with said windshield,
 a first upper extension link interconnecting said first actuating member with said windshield,
 a second lower extension link interconnecting said second actuating member with said windshield, and
 a second upper extension link interconnecting said second actuating member with said windshield, wherein said first lower extension link and first upper extension link are positioned as a mirror image of said second lower extension link and second upper extension link about a longitudinal centerline of the windshield, whereby the position of said windshield is adjustable by rotation of said actuating member.

18. The motorcycle windshield assembly of claim 17, wherein said first and second actuating members include first and second bell cranks, respectively.

19. The motorcycle windshield of claim 17, wherein said actuating assembly further includes
 a first connecting member interconnecting said first actuating member with said first upper extension link, a portion of said first upper extension link being movable in a first slot in said frame, and
 a second connecting member interconnecting said second actuating member with said second upper extension link, said second upper extension link being movable in a second slot in said frame.

20. The motorcycle windshield of claim 17, further comprising a fairing mounted to said frame, said fairing including a first bore and a second bore, wherein said first lower extension link includes a portion movable in said first bore and wherein said second lower extension link includes a portion movable in said second bore.

21. The windshield of claim 20, wherein said portions of said first and second lower extension links are generally cylindrical in shape and are supported for linear reciprocation in said respective first and second bores.

* * * * *